Feb. 23, 1965     H. W. BARNHART     3,170,368
MECHANICAL REGISTRATION OF PROCESS COLOR
Original Filed Jan. 4, 1957     5 Sheets-Sheet 1
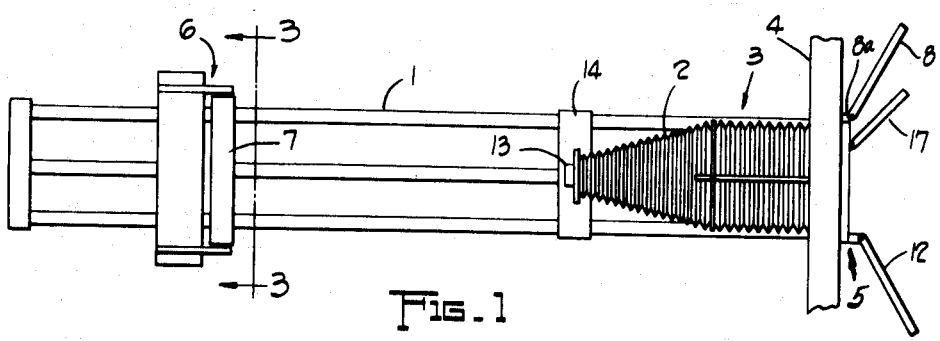
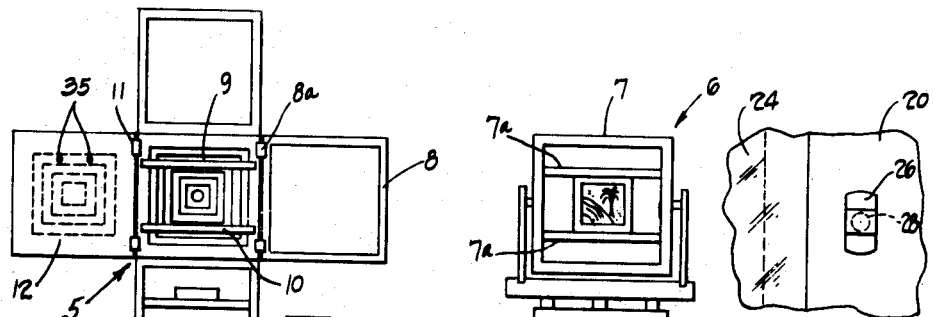
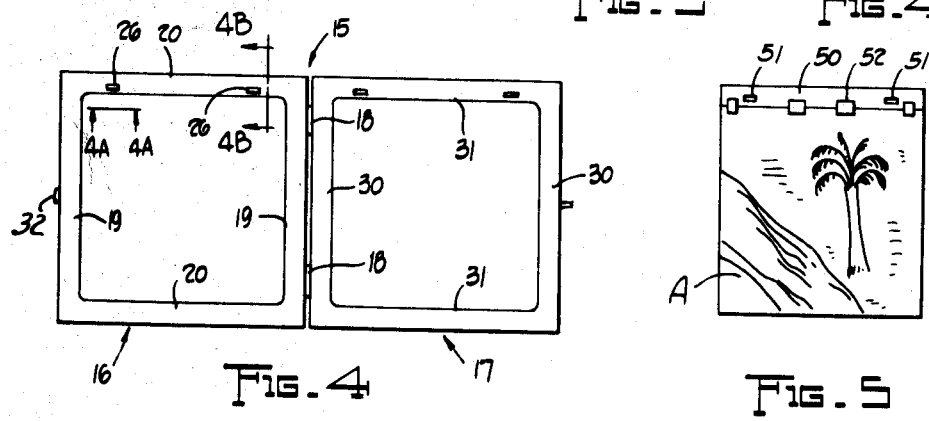
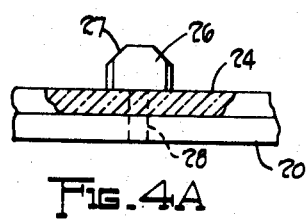
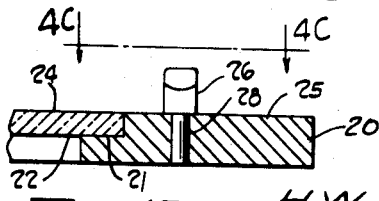
INVENTOR.
H. W. BARNHART
BY Robb-Robb
attorneys

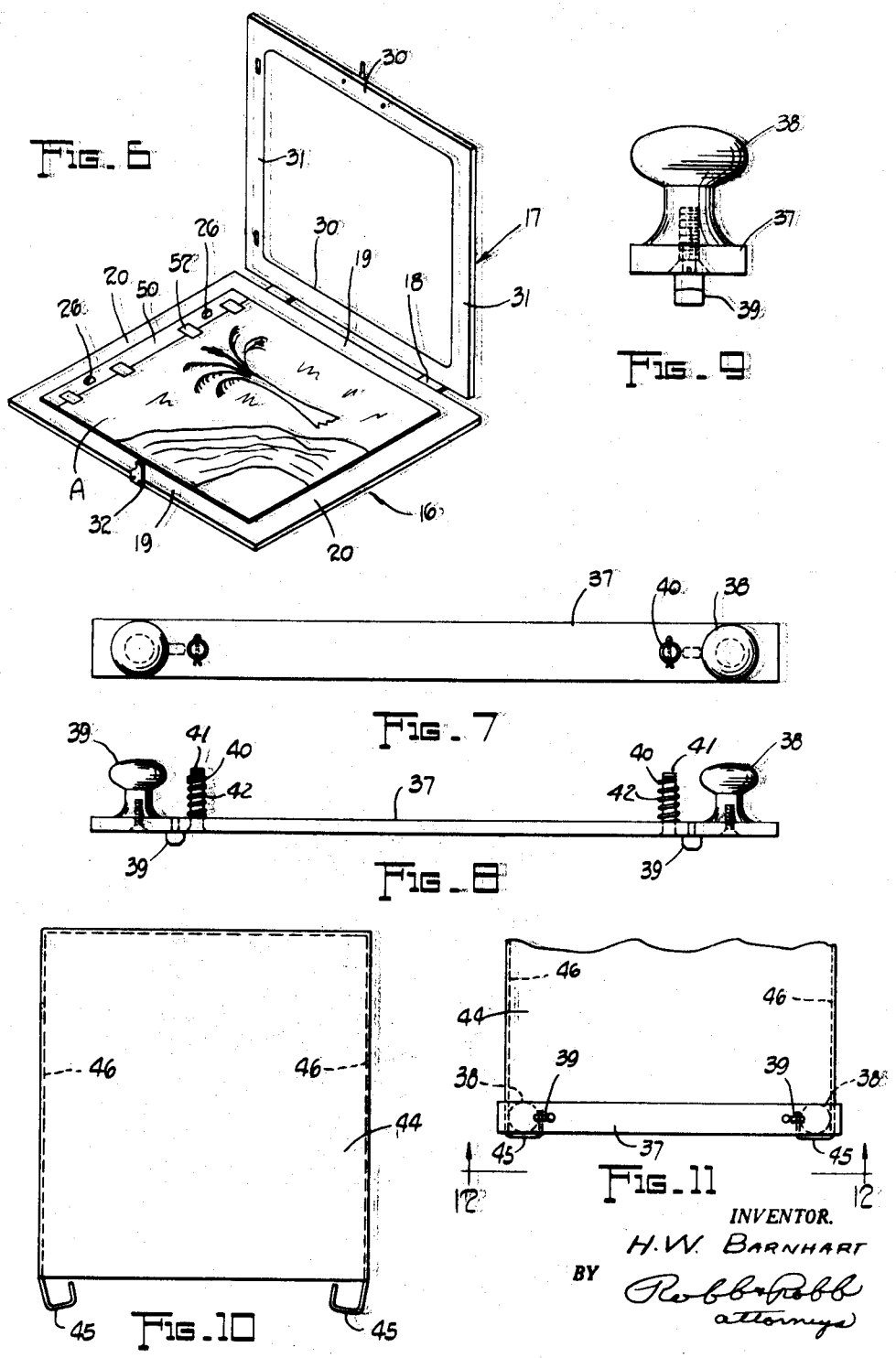

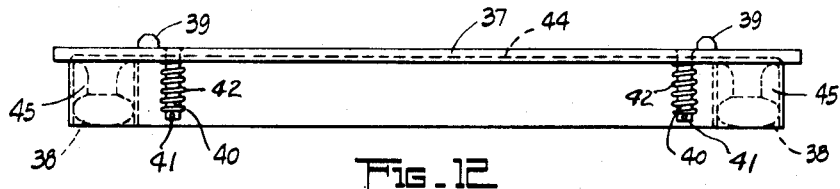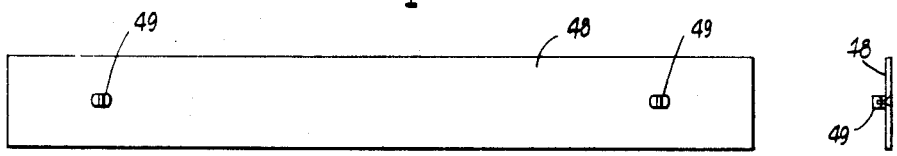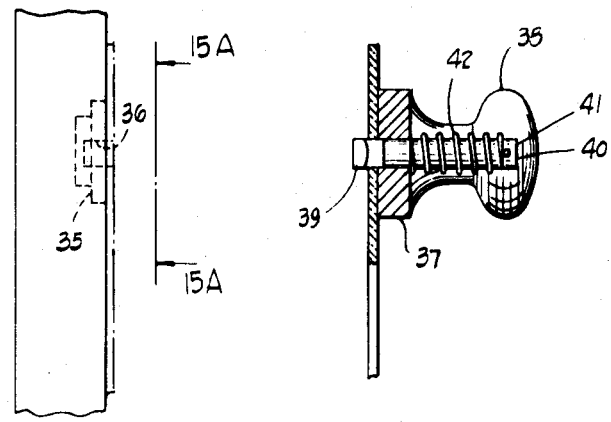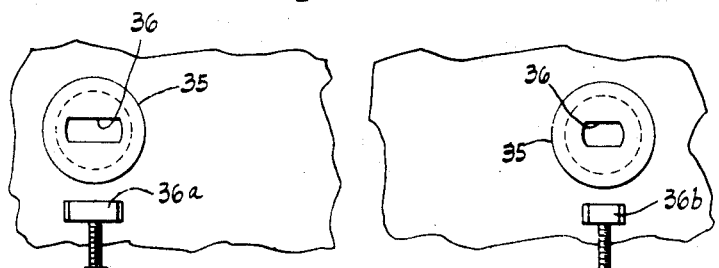

Feb. 23, 1965   H. W. BARNHART   3,170,368
MECHANICAL REGISTRATION OF PROCESS COLOR
Original Filed Jan. 4, 1957   5 Sheets-Sheet 4
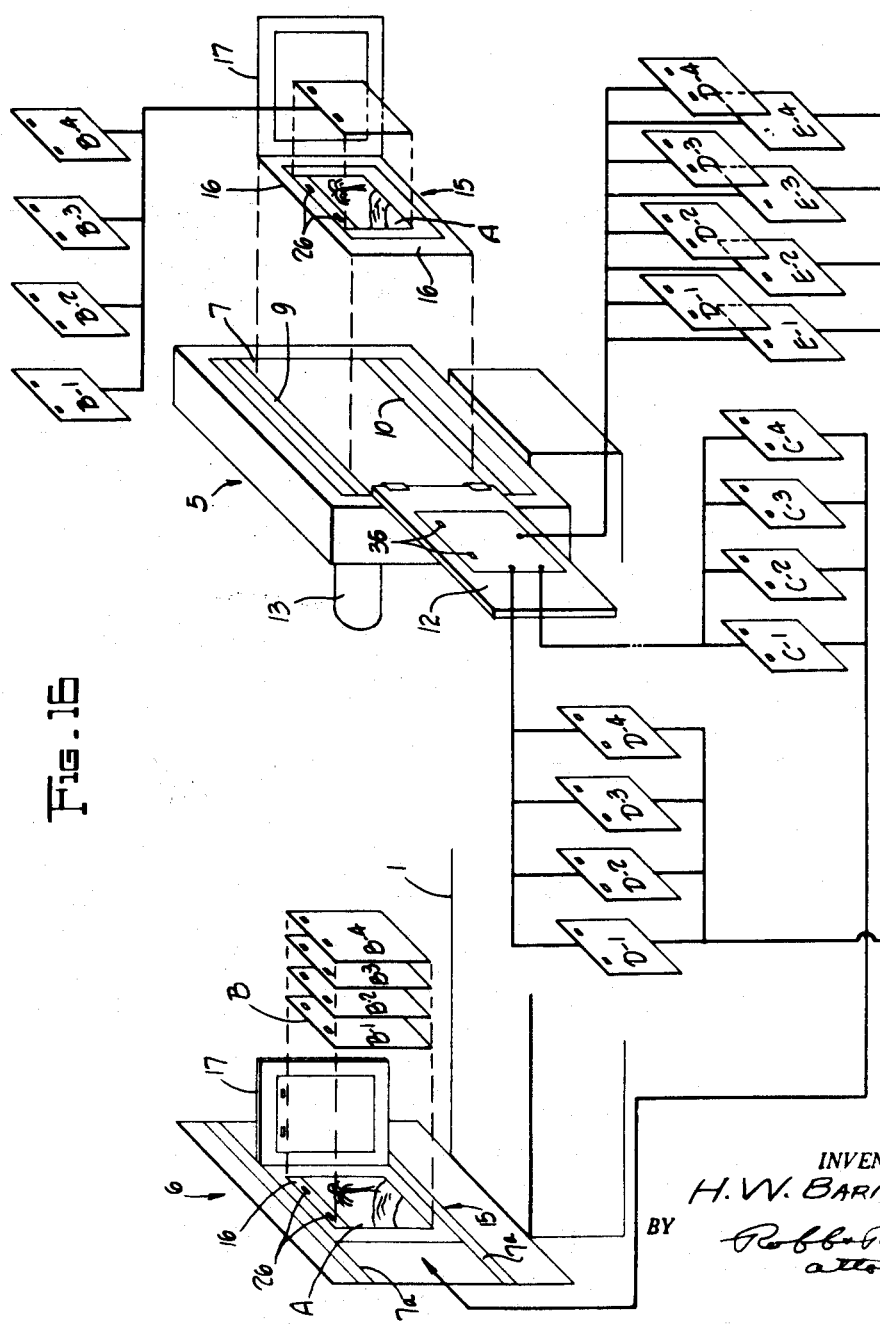
INVENTOR.
H. W. BARNHART
BY

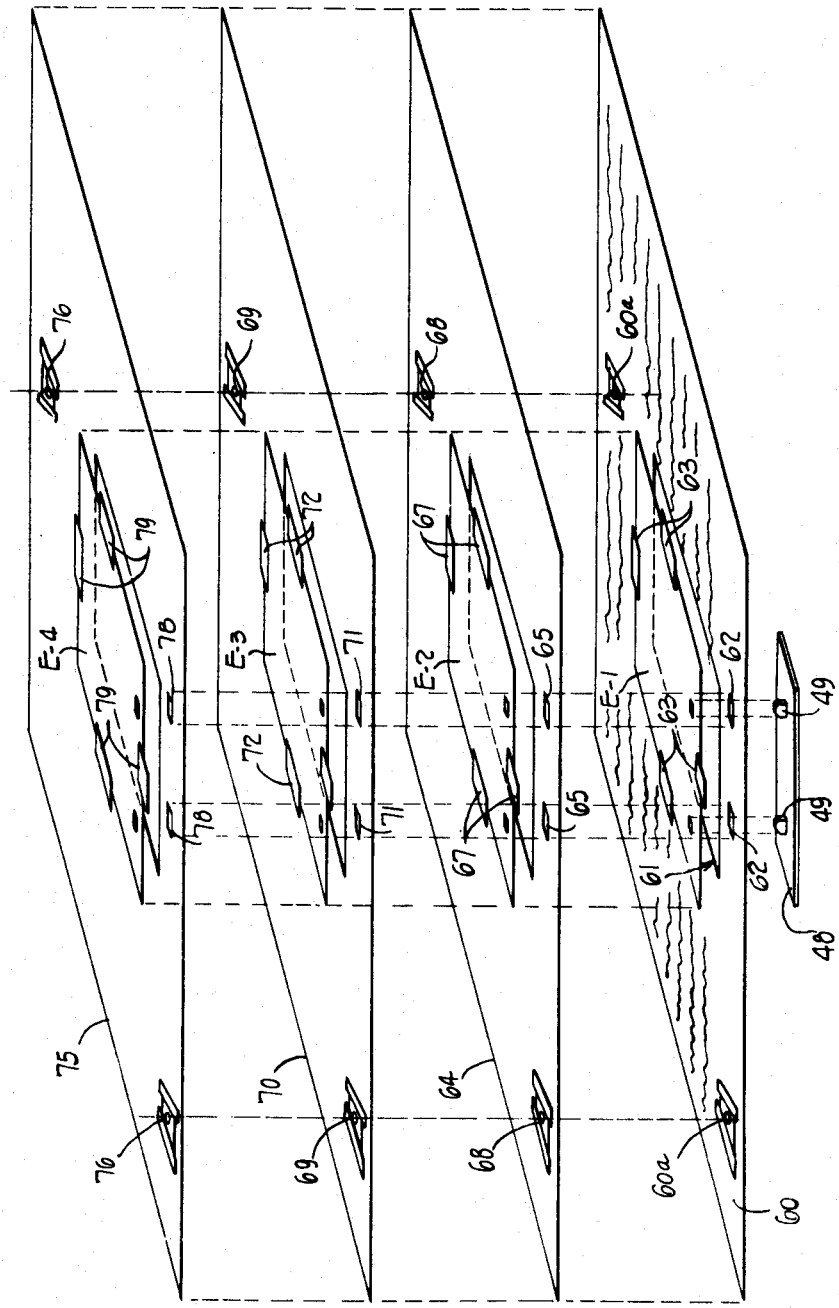

United States Patent Office 3,170,368
Patented Feb. 23, 1965

3,170,368
MECHANICAL REGISTRATION OF
PROCESS COLOR
Homer W. Barnhart, 418 E. Maynard Ave.,
Columbus, Ohio
Original application Jan. 4, 1957, Ser. No. 632,436, now
Patent No. 3,000,737, dated Sept. 19, 1961. Divided
and this application July 14, 1961, Ser. No. 124,123
8 Claims. (Cl. 88—24)

This application is a division of application Serial No. 632,436, filed January 4, 1957, now Patent No. 3,000,737.

This invention relates to lithography and primarily to color phases thereof, more specifically to the preliminary problems of registration of separation images and maintenance of such registration through the various steps by mechanical means.

Although it is known to employ indicia means for establishing registration of process color positives or negatives, prior to and in preparation for transferring to a printing plate, to thus provide for printing of the various colors in proper relation, resulting in a composite sharp, clean, image in full color, no previous mechanical basis has heretofore been available to meet all requirements.

The indicia referred to have generally comprised cross marks scribed on the original color copy and retained by photography. However such marks are more often than not, badly broken or made indistinct as by the half tone screen, compelling careful application by engraving, cutting, scribing or stripping in new marks. Such a procedure is costly because it is very exacting and time consuming, in the final analysis being greatly dependent on the skill of the person, usually a highly paid technician or artist. Even then the possibility of error is always present and the results not necessarily satisfactory irrespective of the efforts devoted thereto.

The solution of the problems of registration in making continuous tone separations of process color art, and subsequent camera positives, contact negatives, and the assembly of films embodying such components by stripping has long been needed in the graphic arts, and even more particularly in the lithographic industry.

With the foregoing general outline of the field in which this invention is particularly useful having been set forth, and noting that it is especially adapted for the use of photographic film as a recording media, it may be stated as a basic advance that no cross marks, register marks or other indicia need be used on the copy or be applied otherwise at any time in the process hereof. All registration is effected mechanically in all color work and even other work through the various steps resorted to from initial continuous tone separations to assembly for final processing.

In carrying out the concept hereof, certain mechanical fixtures are availed of which are constructed so as to be used with the present equipment required for the usual photographic steps heretofore involved, and the actual manipulation of the film components readily understood when described in their usual handling steps modified in accordance with the procedure outlined herein and constituting the invention hereof.

Basically the mechanical device hereof has been developed so as to compel resort to readily made modification of existing equipment and fixtures of simple construction for use therewith.

It is therefore a principal object of this invention to provide positioning means useful in color lithography which is carried out by mechanical registration or availing of mechanical registration, or physical interengagement of film recording mediums with basic positioning means to establish initial registration and maintain the same throughout the various color phase steps.

A further object of the invention is to provide for establishing initial physical reference points in a representation of an image to be reproduced, and thereafter establishing corresponding physical reference points on or in the reproducing medium, such reference points affording related positioning of all images or representations, in separations from initial to final assembly thereof.

Yet another object of the invention is to provide for physical alignment of images representing various color phases in steps of color lithography, which enables precise positioning of such images without reference to visual alignment thereof.

A still further object of the invention is the provision of means useful in color lithography which involves initially establishing physical reference points in a color representation of a scene to be reproduced, establishing co-mating reference points in photographic film providing the various color separations, and enabling assembly of such film in the stripping operation whereby the various color phases are positionable in and thereafter maintained in perfect alignment without resort to visual reference points.

Another important object of the invention dealing with the art of color lithography is the provision of means for initially establishing fixed physical reference points in the color representation of a scene to be reproduced, successively positioning such representation in different locations with reference to a color camera, causing various series of unexposed film to be correspondingly positioned in the camera, exposing such film in the usual steps, but with physical reference points established therein similarly related to the camera, producing the required separation negatives or positives, and subsequently assemblying the required film produced hereby in fixed relation by the physical reference points so as to enable lithographic plates to be made and the colors printed thereby to be in perfect alignment as to the scene or image of which they are components.

Other, further and more particular objects of the invention will be set forth in detail in the specification appended hereto and explained in conjunction with the drawings wherein:

FIGURE 1 is a top plan view of the essential parts of a color camera such as is used in relation to lithographic processing, the view being devoted to the general fundamental parts and not shown in detail.

FIGURE 2 is an end view of a color camera taken from the position within the darkroom, through the wall of which the camera extends.

FIGURE 3 is a view taken about on the line 3—3 of FIGURE 1 looking in the direction of the arrows.

FIGURE 4 is a plan view of one of the fixtures called a frame assembly or frame unit.

FIGURE 4A is an enlarged fragmentary view taken about on the line 4A—4A looking in the direction of the arrows in FIGURE 4.

FIGURE 4B is a fragmentary sectional view taken about on the line 4B—4B of FIGURE 4 looking in the direction of the arrows.

FIGURE 4C is a plan view, fragmentary in nature taken about from the position indicated at 4C—4C in FIGURE 4B looking in the direction of the arrows.

FIGURE 5 is a view showing the color presentation or original.

FIGURE 6 shows the frame unit assembly of FIGURE 4 in perspective, with the representation or scene of FIGURE 5 emplaced thereon.

FIGURE 7 is a side elevational view of one of the fixtures used in the method hereof, the fixture being known as a positioning bar.

FIGURES 8 and 9 are plan and end views respectively of the positioning bar of FIGURE 7.

FIGURE 10 is a plan view of another fixture used in the method hereof known as a positioning platen.

FIGURE 11 shows the positioning platen of FIGURE 10 with the positioning bar of FIGURES 7 to 9 emplaced thereon.

FIGURE 12 is an end view taken from the left hand of FIGURE 11 showing the positioning bar in location on a positioning platen.

FIGURES 13 and 14 are plan and end views respectively of a further fixture called a stripping bar.

FIGURE 15 is an exploded view, fragmentary in nature, showing the use of the fixture called a positioning bar in reference to the color camera.

FIGURE 15A is a fragmentary view taken about from the position 15A—15A of FIGURE 15 looking in the direction of the arrows.

FIGURE 16 is a largely diagrammatic or schematic view showing the relationship of the fundamental parts of a color camera and the location of the fixtures and parts hereof in the various stages of processing and the elements used involving film whether it be unexposed or developed negatives or positives.

FIGURE 17 is a somewhat diagrammatic view illustrating the stripping operation.

Inasmuch as the invention hereof involves the use of a known type of color camera such color camera will first be generally described as to at least its important components which are particularly related to the method hereof, other of the components which are standard and may be of any particular type in accordance with the wishes of the user, not being specifically set forth.

With the foregoing in mind, FIGURE 1 illustrates generally a color camera having a bed denoted 1 upon which is supported the usual bellows 2 of a camera generally designated 3, which camera as is well known is mounted so as to extend into a darkroom through the wall designated 4, the back of the camera generally designated 5 being within the darkroom.

The bed 1 of course extends into a room adjacent the darkroom and has mounted on the same the copy board unit generally denoted 6 including a transparency or positive holder 7 mounted thereon in accordance with any conventional type of camera.

At the back of the camera as is usual in cameras of the type herein described, there is provided the usual back unit including a ground glass unit denoted 8 which is hingedly connected to the camera at 8a, the hinge connection being a vertical type of hinge.

Mounted in conventional manner at the camera back, are the screen bars 9 and 10 which are movable upwardly and downwardly to support frames of different sizes thereon.

Similarly hingedly connected and by vertical hinges as at 11 is a vacuum back designated generally at 12 which is arranged to swing over the bars 9 and 10 in accordance with conventional camera practice.

It will be of course understood that a suitable lens unit is provided for the camera at 13 being carried on an adjustable carriage at 14 which carriage slides on the bed or frame 1 previously mentioned.

Certain of the fixtures will next be described, which fixtures are provided for carrying out the invention hereof, and illustrated in certain of the particular figures, the FIGURE 4 disclosure illustrating the frame unit generally designated 15 which is comprised of a rectangular base frame part 16 and a similar frame part 17 which will be designated a cover frame part. The parts are hingedly connected as at 18 so that they may swing into substantial alignment and contact.

Describing the frame 16, it will be seen that it comprises a pair of side rails 19 and end rails 20 which rails are formed as shown in FIGURE 4B as being rabbetted at 21 so as to receive a suitable glass member 22 therein, the glass member 22 thereby being flush as to its upper surface 24 with the surface 25 of the adjacent rail whether it be 20 or 19.

On one of the rails 20 and suitably attached thereto as indicated in the FIGURES 4A, 4B and 4C are a pair of nibs, plugs, or generally speaking positioning means designated 26 which nibs are spaced about as shown in proportion in FIGURE 4 and tapered at 27 so as to enable the same to be entered in suitable openings corresponding thereto in film as will be subsequently described. The nibs 26 may be fastened to the rails 19 and 20 as by means of shanks 28 which are press fitted in openings provided.

It will be understood that the frame member 17 is substantially identical to the frame part 16 and comprised of side and end rails 30 and 31 respectively. The rails 31 at the upper portion of the unit 17 will be in turn provided with openings into which the nibs 26 may be entered when the frame parts are closed around the hinges 18 so as to come into face to face conjunction and a suitable latch member is provided at 12 for fastening the members in the closed condition.

For purposes which will be explained in detail as the description of the method of use of the invention is set forth, the vacuum back 12 is equipped with a pair of inserts 35 shown in enlarged detail in FIGURES 15 and 15A, which inserts are provided with openings 36. One of the openings 36 may be somewhat longer than the other, that on the left in FIGURE 15A being so formed. To prevent film indentation under vacuum the openings 36 are provided with removable plugs 36a and 36b shown in the figure as having been removed or ready to be inserted. The openings are to receive the nibs or plugs similar to the nibs or plugs 26 previously mentioned which nibs or plugs are provided on other of the fixtures and will be subsequently pointed out in detail. The provision of the inserts 35 in the vacuum back is to enable the positioning of film with regard thereto, in the manner to be set forth, where the positioning bar of FIGURES 7, 8 and 9 is availed of, the positioning bar of those figures now being described in detail.

The positioning bar of the FIGURES 7, 8 and 9 just mentioned, includes a flat bar member 37 of any suitable length, being approximately the same length as the top rail 20 of the frame member 16 previously described, and being a relatively wide, flat part. At the extremities the part 37 is equipped with knobs 38 which knobs are for gripping the part and intermediate the knobs are other nibs or plugs or positioning means 39 of the same shape and configuration as the nibs or plugs 26 previously mentioned. It will be definitely understood that the spacing of the nibs or plugs 39 is identical in the positioning bar of FIGURES 7, 8 and 9 to the spacing of the nibs or plugs 26 in the frame assembly of FIGURE 4 and likewise the spacing is the same as respects the inserts 35 in the vacuum back 12 in FIGURES 2 and 15A.

The positioning bar 37 is further equipped with a pair of spring pressed release units 40 which are arranged so as to have heads 41 at one end a shank connected thereto and extending through the bar 37 so that the shank will move with regard to the bar, a spring 42 being positioned around the shank and adapted to hold the shank and its headed end in the condition illustrated in FIGURES 7 and 15. By pressure upon the head 41, the other end of the shank will be caused to move out of the plane of the bottom of the bar 37, and force any film positioned thereon away from the body or bottom as will subsequently be set forth in a complete explanation of the method hereof.

A further fixture which should be described is the positioning platen which is a sheet metal member shown in FIGURES 10, 11 and 12 of generally rectangular configuration and designated 44 having offstanding encircling arm parts 45 at opposite corners, which parts 45 are of the general shape shown in the said FIGURE 10. The platen body 44 is provided with downwardly formed skirt portions 46 which will support the platen spaced from a surface engaged thereby and the encircling parts 45 are adapted to position the knobs 38 of the positioning bar 37 thereon as shown in FIGURE 11 for purposes which will be readily understood as this description proceeds. This arrangement is shown in greater detail somewhat in FIGURE 12 with the bar 37 positioned so that the nibs or plugs 39 are upstanding therefrom and the knobs 38 as shown.

A still further fixture which is availed of in carrying out the complete invention hereof is the so-called stripping bar shown in FIGURES 13 and 14, the bar including a body of bar form 48 similar to the bar 37 of FIGURE 12, in this instance being a simple long rectangular part and having fastened thereto a pair of nibs or plugs or generally speaking positioning means 49 fastened thereto, the spacing of the means 49 being identical to the spacing of the corresponding plugs or means of the positioning bar of FIGURE 7, the nibs or plugs 26 of the FIGURE 4 frame disclosure and likewise the spacing of the inserts as to the openings 36 therein of FIGURE 15A.

Before turning to a description of the invention hereof as it involves the use of the various fixtures and the color camera described in some detail, it should be pointed out that the color camera mentioned is of course equipped at the copy board position designated 6 in FIGURE 1 and likewise in FIGURE 3 with the usual bars 7a, which would in the normal use of a color camera be availed of to support transparencies in the usual manner.

The various mechanical parts and certain of the fixtures now having been described in detail as to their formation and general construction, the improvement which is made possible by availing of the same is now described as being availed of to effect the reproduction of a film color transparency by the indirect method in four colors with masks and stripping operations also involved, in fact all the steps preparatory to making a lithographic press plate being in some measure modified by the invention hereof.

Assuming therefore that the film color transparency designated A and shown in FIGURE 5 is to be reproduced and may be said to be a representation of a scene to be reproduced, is first provided with a strip of clear film designated 50 which is initially punched so as to have the openings 51 formed therein and thereafter fixed as by means of masking tape or similar adhesive material indicated generally at 52 to the original A. This punching may be effected in any known manner, the spacing of the openings 51 being pointed out as being identical to the spacing of the several positioning means or nibs or inserts previously mentioned as to the openings or nibs described.

With the foregoing assembly which will now be designated solely as A, and described as being the so-called representation of the scene to be reproduced, assembled as in FIGURE 5 the same is thereafter manipulated in a manner to be set forth now.

The frame of the FIGURE 4 disclosure and designated generally at 15 is first of all mounted in the screen bars at the back of the camera as shown in FIGURE 16. Thereafter frame member 17 is opened and the transparency A is positioned in the frame by placing the punched holes 51 over the nibs 26 which are at the top of the frame as shown in said FIGURE 16. Subsequently suitable unexposed film, which will be the mask is similarly punched and as shown at B-1 in turn positioned so as to have the punched openings therein over the nibs 26 adjacent the original A. The cover of the frame 17 is closed and the film exposed with the flashlamp or otherwise making the so-called color correcting or density mask as the case may be. This operation may be repeated for the film designated B-2, B-3 and B-4 representing the four colors for which masks are desired. Obviously the mask unexposed negatives B-2, B-3 and B-4 are preliminarily punched as was the mask B-1 and similarly positioned and exposures made.

Thereafter of course the films thus exposed are in turn developed for the further steps in the process now to be set forth.

Thereafter the frame unit 15 is moved to the copy holder or board location, where it is thereupon mounted in the bars 7a and the cover 17 swung open again, so that the original representation of the scene indicated and denoted A may be positioned again on the nibs or parts 26 by the openings 51 provided It will be understood that the color masks B-1, B-2 and so forth previously produced were of course made in the usual photographic manner so as to perform their function as color masks and they are thereafter with the frame unit 15 positioned at the copy board location as previously described, with mask B-1 for example being initially mounted on the nibs or parts 26 and the cover frame 17 closed. Thereafter exposure is subsequently made with film mounted as will be described shortly, all of the masks being successively positioned with the frame unit at the copy board location as just described.

Now in order to provide a recording medium for the original A with one of the masks B-1 for example thereon, unexposed film must be mounted at the back of the camera and this is effected in the following manner. A further piece of the proper unexposed film material is selected and suitably punched at one edge, this film being designated in FIGURE 16 for example at C-1. The film thus selected is of course unexposed film and is handled in the darkroom at the back of the camera being positioned by the openings therein over the nibs or plugs 39 on the positioning bar previously described as shown in FIGURES 7, 8 and 9. With the film thus carried on the positioning bar, the positioning bar having been first located on the positioning platen in the position in FIGURE 12, it may thereafter be removed from the platen with the film emplaced on the positioning means 39 and in turn carried to the vacuum back 12 where the nibs or plugs 39 are suitably engaged or entered into the openings 36 in the inserts 35 in the said vacuum back 12. The vacuum back is thereupon put into operation so that the film C-1 is caused to adhere to the said back, having been located with reference thereto by the positioning bar and the bar manipulated as by pressing on the ends 41 of the release members 40, to effect withdrawal of the nibs 39 from the openings 36. The foregoing is shown in some detail in FIGURE 15, being fragmentary of course but illustrative of the manipulation just described. Thereafter the vacuum back is swung closed and the film C-1 exposed in the usual photographic procedure so as to form the separation negative and the said film is developed. It will be recalled that the original representation of the scene A has been previously positioned at the copy board location with the mask B-1 located therewith and thus the separation negative C-1 is provided for that particular mask. Obviously subsequent positioning of such unexposed negatives as C-2, C-3 and C-4, positioned on the vacuum back in a similar manner to that described with reference to C-1 will be undertaken, the appropriate masks B-2, B-3 and B-4 being positioned with respect to the original A at the copy board location. Obviously the photographic exposure will take place, subsequent developing being resorted to for the film from the C series and thus the separation negatives available for use.

Thereafter the separation negatives C-1, C-2, C-3 and C-4 are positioned at the copy board location on the nibs or plugs 26, when the frame member 17 is swung open and these developed negatives will of course be successively so positioned for exposure as will now be described.

As an example of the process step now to be described, it will be assumed that the separation negative C-1 is mounted at the copy board location on the frame unit 15 as by means of the nibs 26, and thereafter suitable unexposed film will be selected, punched and mounted at the vacuum back by means of the positioning bar unit of FIGURE 7 in the manner previously described with reference thereto. The usual screen for providing screened positives is positioned with respect to the camera and exposure of the film which in this instance will be designated D-1 is made so as to provide the screened positive of the separation negative C-1 for example which all of this time have been positioned at the copy board location.

Obviously successive films D-2, D-3 and D-4 may likewise be positioned at the vacuum back of the camera and exposed, the separation negatives corresponding thereto and being designated C-2, C-3 and C-4 having been positioned at the copy board location in the manner previously described.

With the screened positives thus provided, these films obviously having been developed in the usual manner, it will now be desirable probably to produce contact negatives and for this purpose the platen of FIGURE 10 and FIGURE 11 may be again availed of as is true in every instance where a film or unexposed film is mounted at the vacuum back. The locating of the film is effected by the positioning means on the platen in cooperation with the nibs or plugs 39 as shown in FIGURE 12 by initially placing the screened positive with its correspondingly punched openings therein over the nibs 39. Thereafter suitable unexposed film is again selected, and punched with openings located as has been true in all of the other instances where punching has taken place or the film exposed, and the film placed over the nibs 39 in contact with screened positive D-1 for example, previously referred to. In this instance the contact negatives which are going to be provided will be designated E-1, E-2, E-3 and E-4. With the film, unexposed E-1 for example and the positive D-1 located on the positioning bar, the same is moved to the vacuum back 12, the nibs 39 entered in the openings 36 in the inserts 35 and the vacuum caused to grasp the film emplaced on that surface.

In order to maintain the positive in position over the film to be exposed, since the vacuum is not directly effective thereon, a clear film cover will necessarily be provided, such cover being of sufficient extent to overlie the positive and be gripped by the vacuum at the edges.

If the usual vacuum frame available in the industry is resorted to for the exposure to make contact negatives, the positioning bar 37 is located in the platen as in FIGURE 12, unexposed film punched and mounted on the nibs 39. The corners of the positive are trimmed in this instance to enable tape to be used for holding the films in position when transferred to the vacuum frame.

Thereafter the exposure is made in the usual manner and the contact negatives thus provided are developed as is customary.

It will therefore be understood that a series of contact negatives E-1, E-2, E-3 and E-4 are available now for use at the stripping table for assembling the negatives on to a masking paper layout sheet or color masking sheet.

This operation is illustrated in the FIGURE 17 disclosure and may be said to comprise the final step.

Initially it will be assumed that the masking paper layout is generally designated at 60 and that the scene which is the subject of the invention hereof is to be located at the position generally indicated at 61.

After the usual imposition masking sheet is prepared, round hole tapes being located in opposite edges thereof, color masking sheets may next be prepared in the usual manner therefrom. A first such sheet comprising a large piece of masking paper is located over the imposition masking sheet, round holes in tapes being provided at each edge, and related to the round holes in the imposition sheet by means of suitable studs or rivets usually used.

With the imposition masking sheet aligned with a first color masking sheet, the negative outlines are ruled thereon.

The sheet thus ruled is in turn aligned with sufficient additional sheets, by the hole tapes therein, to provide one such sheet for each color phase corresponding to each process color separation negative. Thereafter, as usual, all of the openings are provided in the sheets by a series of cuts penetrating all such sheets.

Those skilled in the art will readily understand the foregoing as providing for subsequent positioning of the respective process color separation negatives, but the manner in which such assembly is facilitated by this invention will now be set forth.

Now in order to assemble the various separated process color negatives on their respective color masking sheets, it will be assumed that the color masking sheet which is to have the negative E-1 stripped thereon, is initially laid out, such masking sheet being designated 60, and the separated process color negative E-1 is located so that the outline of the negative is aligned with the opening in the sheet 60. If there are other negatives of the same color phase to be assembled on the sheet, and other openings therefor in the sheet 60, they are likewise aligned in their respective places, but in the examplification herein, the handling of only one of the process color negatives prepared and designated E-1 as previously indicated is described in detail.

The paper at the places indicated as 62 in FIGURE 17 is cut away, after the negative is initially located by masking tape such as 63, or prior thereto as will appear to be desirable by the person availing of the invention hereof.

Thereafter a further color masking sheet designated 64, prepared as before described, and of the same size as the masking sheet 60 is positioned above the latter and located by means of the round hole elements designated 63 therein, and the elements 60a, so as to align the negative openings in the masking sheets 60 and 64, both of said sheets and the negative outlines being thus subsequently maintained in register.

With the sheet 64 in place as indicated, the openings 65 are cut in the sheet in the general area and of sufficient size to enable nib openings in the process color negative E-2 to the readily adjusted with respect to the openings 65.

The stripping bar 48 is now placed beneath the color masking sheet 60 with the nibs 49 of said bar extending upwardly through the openings 62 and through the nib openings in the negative E-1, whereby the stripping bar is thus positioned since the negative E-1 has been previously aligned with the negative opening in the sheet 60 and fixed by the masking tape 63 thereto. The nibs 49 likewise extend through the nib openings in the negative E-2, and that negative is thereafter taped into position and the image of that negative will thus be aligned with the image of the negative E-1, because of the manner in which the respective negatives were prepared as before set forth. Masking tape is then applied as indicated at 67 and the negative E-2 is thus securely fastened in place. Additional masking tape will usually be used although not shown in the FIGURE 17 as it will be apparent to those skilled in the art.

Thereafter a further color masking sheet prepared in a manner identical to that set forth with respect to the masking sheet 64 previously described as prepared, with the round hole elements 69 fastened therein and located by means of rivets passing through the holes 60a, 68 and 69 whereby the sheet designated in this instance as 70 is arranged so that the negative opening or openings therein are aligned over the negative opening or openings in the sheets 60 and 64.

With the masking sheet 70 thus aligned, the openings 71 are made therein, being of such a size as will readily permit the nibs 49 of the bar 48 to pass therethrough whereby the negative E-3 may be positioned by means of the nib openings therein engaging the nibs 49. The masking tape indicated at 72 may thereafter be applied to maintain the negative E-3 in its location and of course additional masking tape may be availed of as required, though not shown.

A further color masking sheet 75, having the negative opening or openings therein may be provided for the negative E-4, the positioning of the sheet 75 by means of the round hole elements 76 therein being effected with respect to rivets extending through the holes 60a, 68 and 69, the sheet 75 thereby being aligned with the sheets 60, 64 and 66. The openings 78 are prepared in the sheet 75 so as to readily accommodate the nibs 49 of the stripping bar 48. Thereafter the negative E-4 is positioned by means of the nib openings therein receiving the nibs 49, and masking tape 79 is availed of to fasten the negative E-4 in place. It will be understood as has been previously set forth that other negatives, if there be such for all of the other portions of the finally printed page are similarly located on the respective masking sheets in accordance with the imposition layout.

In view of the foregoing, it will be clearly seen that the negatives E-1, E-2, E-3 and E-4 have been again brought into perfect register by means of the stripping bar 48 and nibs 49 thereon, and since the sheets which are the basic members in any event denoted 60, 64, 66 and 75 are also aligned, the registry of the color elements of the respective color separated negatives will be maintained from the initial separation to the final processing at the stripping table.

It will be readily apparent from the foregoing that a composite unit is thereby provided with all of the negatives representing the various separation phases of the color film being arranged in precise alignment. The openings formed therein have always remained in the same location with reference to the subject matter of the film or the representation of the scene throughout every step previously described and have at the stripping table been finally brought into conjunction so that the color phases thereof are maintained in proper alignment. The lithographic press plate may be made therefrom in the conventional manner which is not a part of this invention but is well known and will be apparent from a consideration of FIGURE 17.

It will be understood in view of the foregoing description that no resort has been necessary to be made to the usual register marks placed upon the original and carried on to the various films made therefrom, and thus the necessity for visual alignment of films is completely obviated hereby.

It should also be understood that not every detailed step of the reproduction of a representation of the scene has been recited, involving as they sometimes do the dot etching or other correction of the screened positives for example such steps being apparent to those skilled in the art as not being affected substantially by the invention hereof but on the other hand certain phases thereof obviously being made more simple. Further it will be apparent that not every process or method which can take advantage of the invention outlined hereof, using the fixtures set forth has been described since such adaptations will be largely understood by those skilled in the art likewise.

Finally it should be pointed out by way of summary that the invention hereof automatically assures registration between colors at all times from the time a transparency is placed in the camera until the separated negatives reach the stripping table for assembly with other components of a layout.

I claim:

1. In combination, in a process color camera assembly of the class described, a frame unit movable to various positions in said assembly, spaced film positioning means on said unit, said camera having lens means and a back unit at one end, a copy board unit therefor spaced from the lens means and screen bars carried by said back and board units, said frame unit being shiftable to said board and back units and supported by the bars therein, and a vacuum back member in said back unit including positioning means having the same spacing as the means of the frame unit aforesaid, whereby film or the like having mating positioning means is inter-changeably positionable with respect thereto and engageable therewith.

2. In a process color camera assembly of the class described, in combination, a camera unit, a copy board unit movable to various positions in said assembly, a back unit at one of said camera units, lens means intermediate said units, said units each including screen bars or the like therein, a frame unit having positioning means therein arranged to support film or the like thereby, said frame unit being positionable on said bars, a vacuum back member in said back unit, and positioning means on said back members arranged in the same relationship as those of the frame unit and adapted to position the film or the like as the frame unit positions the same, for exposure of film through said lens means.

3. The combination as claimed in claim 2, wherein the positioning means of the frame unit comprise a pair of nibs to inter-engage punched openings in film or the like, the corresponding means of the vacuum back member comprise inserts therein spaced as stated, and a positioning bar is provided having a pair of nibs spaced as those on the frame unit and adapted to interengage with mating portions of the inserts aforesaid, whereby to locate film or the like with respect to said back member.

4. The combination as claimed in claim 2, wherein the frame unit comprises a pair of hinged members, adapted to fold into face-to-face relationship, each member having a glass insert therein, the nibs referred to being arranged to support film or the like between the said hinged members.

5. In combination, in a process color camera assembly of the class described, a camera unit, a back unit, at one end of said camera unit, a vacuum back for said back unit, openings in said vacuum back to receive nibs, and a positioning bar for said vacuum back, said bar having nibs thereon to be positioned in the openings aforesaid, said bar thereby locating film engaged with said nibs in predetermined position in respect to said camera unit.

6. The combination as claimed in claim 5, wherein a copy board unit is provided for said camera unit, and a frame unit including nibs thereon having the same spacing as those of the vacuum back is provided, said frame unit being positionable at the back unit and copy board unit.

7. The combination as claimed in claim 6, wherein the frame unit comprises a pair of hinged members, adapted to fold into face-to-face relationship, each member having a glass insert therein, the nibs referred to being arranged to support film or the like between the said hinged members.

8. The combination as claimed in claim 5, wherein a frame unit is provided to be supported in said back unit, said frame unit having nibs therein to support punched film thereon, said nibs being spaced to correspond precisely with the openings in the vacuum back aforesaid, whereby film punched for support by the vacuum back may be supported by said punchings in the frame unit.

References Cited by the Examiner

UNITED STATES PATENTS

| | | | |
|---|---|---|---|
| 1,151,461 | 8/15 | Hatt | 96—30 |
| 2,050,552 | 8/36 | Baker | 96—30 |
| 2,142,437 | 1/39 | Eaton | 96—30 |
| 2,192,924 | 3/40 | Maher et al. | 96—30 |
| 2,334,745 | 11/43 | Blaauboer et al. | 96—30 |
| 2,418,226 | 4/47 | Haff | 88—24 |
| 2,512,937 | 6/50 | Hartman | 96—30 |
| 2,570,668 | 10/51 | Halpern | 88—24 |
| 2,701,196 | 2/55 | Conrad | 96—30 |
| 2,836,099 | 5/58 | Weishaupt | 88—24 |

EVON C. BLUNK, *Primary Examiner.*

EMIL G. ANDERSON, NORTON ANSHER, *Examiners.*